(12) United States Patent
Kao

(10) Patent No.: US 6,386,746 B1
(45) Date of Patent: May 14, 2002

(54) OPTICAL FIBRE ARTIFICIAL TREE OR FOLIAGE ARTICLE

(75) Inventor: Cheung Chong Kao, Chai Wan (HK)

(73) Assignee: Boto (Licenses) Limited, Hong Kong (HK)

( * ) Notice: Subject to any disclaimer, the term of this patent is extended or adjusted under 35 U.S.C. 154(b) by 0 days.

(21) Appl. No.: 09/594,600

(22) Filed: Jun. 15, 2000

(51) Int. Cl.⁷ .................................................. F21V 8/00
(52) U.S. Cl. ........................... 362/567; 362/123; 428/18
(58) Field of Search ................................ 362/122, 123, 362/559, 565, 567, 568, 806; 428/18, 19

(56) References Cited

U.S. PATENT DOCUMENTS

| | | | |
|---|---|---|---|
| 4,068,118 A | * 1/1978 | Carrington | 362/123 |
| 4,777,571 A | 10/1988 | Morgan | 362/123 |
| 4,858,086 A | * 8/1989 | Pietrantonio et al. | 362/123 |
| 5,067,059 A | * 11/1991 | Hwang | 362/565 |
| 5,104,608 A | * 4/1992 | Pickering | 362/568 |
| 5,422,797 A | * 6/1995 | Shattan | 362/123 |
| 5,517,390 A | * 5/1996 | Zins | 362/123 |
| 5,558,422 A | * 9/1996 | Sanford | 362/567 |
| 5,702,170 A | * 12/1997 | Broderick | 362/568 |
| 6,056,427 A | * 5/2000 | Kao | 362/568 |

* cited by examiner

Primary Examiner—Alan Cariaso
(74) Attorney, Agent, or Firm—Dorsey & Whitney LLP

(57) ABSTRACT

An artificial tree or foliage article is provided with at least one bundle of optical fibers (11) having a proximal end at which, in use, a light source is directed, and a distal end, wherein adjacent the distal end the fibers are bent sharply to induce fractures therein.

8 Claims, 6 Drawing Sheets

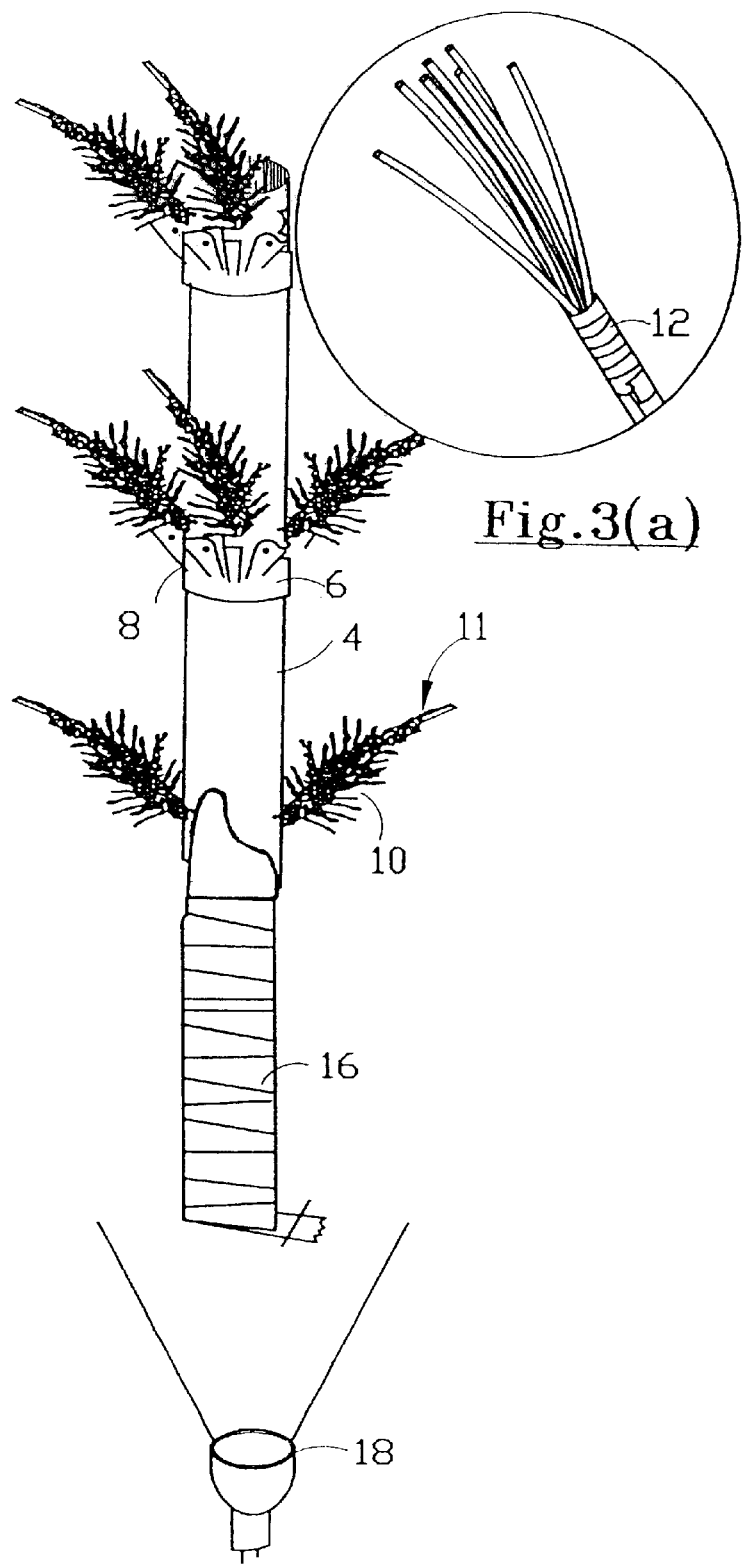

OPTICAL FIBRE ARTIFICIAL TREE OR FOLIAGE ARTICLE

BACKGROUND OF THE INVENTION

The present invention relates to an artificial tree or foliage article provided with optical fibres. It is known to provide an artificial tree such as a Christmas tree with a plurality of optical fibres and a light source directed at proximal ends of the fibres, so that at distal ends thereof light is emitted from the fibre ends creating a visually striking and decorative effect. Such a tree is described for example in U.S. Pat. No. 4,777,571 to Morgan.

In a development of this arrangement, the present invention seeks to provide a tree of this type having enhanced decorative effect.

SUMMARY OF THE INVENTION

According to the present invention there is provided an artificial tree or foliage article provided with at least one bundle of optical fibres having a proximal end at which, in use, a light source is directed, and a distal end, wherein adjacent the distal end the fibres are bent sharply to induce fractures therein.

At the points where the fibres are bent sharply the light is reflected or otherwise disposed from the fractures within the fibres thereby increasing the decorative effect.

In a preferred embodiment the optical fibres are bent so as to splay radially outwardly from the fibre bundle. The fibres of each bundle may be secured by tape along their length up to a short distance from the tips of the fibres, the fibres being sharply bent at the position where the tape finishes. The position at which the fibres are sharply bent may be in the region of 5 cm from the tips of the fibres. The tree or foliage article may have a central trunk or stem with a plurality of branches, wherein the bundles of fibres extend along the central trunk or stem with individual bundles of fibres extending along individual branches.

In a further aspect, the invention resides in an artificial tree comprising a hollow trunk and a plurality of branches connected to the trunk, a plurality of bundles of optical fibres extending along the inside of the trunk from a lower end thereof at which, in use, a light source is directed, and exiting the trunk adjacent to the individual branches along which the bundles are led, the fibres being sharply bent at regions near to the fibre ends so that the fibres have light-dispersing fractures therein.

In a further aspect, the invention resides in a method of forming an artificial tree or foliage article having a plurality of branches and a plurality of optical fibres, comprising: (a) providing bundles of fibres which are secured to extend along respective branches; and (b) near ends of the fibre bundles, sharply bending the fibres so as to induce fractures within the fibres.

BRIEF DESCRIPTION OF THE DRAWINGS

An embodiment of the invention is now described, by way of example only, with reference to the following drawings in which:

FIGS. 3 and 3(a) show schematically a tree provided with optical fibres in accordance with the prior art;

FIG. 8 shows a pair of chains of fibre optical bundles being secured to form a wreath.

DETAILED DESCRIPTION OF THE PREFERRED EMBODIMENT

Figures 2A, 2B, 2C:
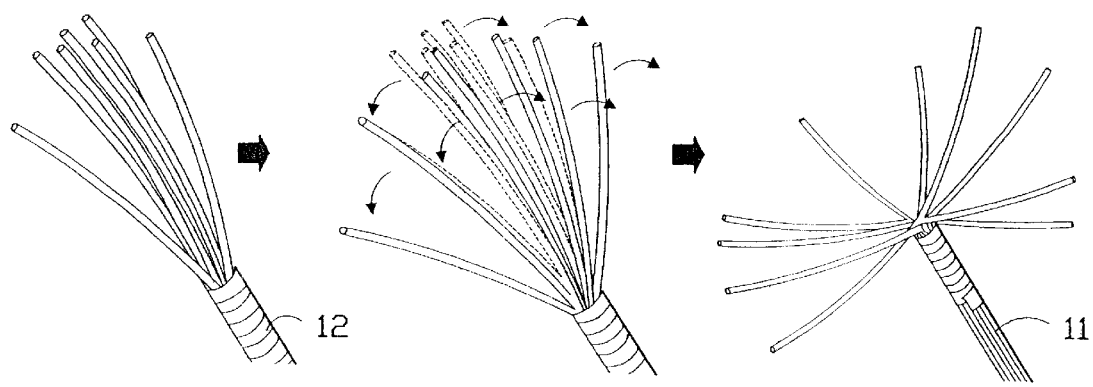
FIGS. 2(a) to (c) show the steps of deforming the fibres in accordance with an embodiment of the invention.
Figure 1:
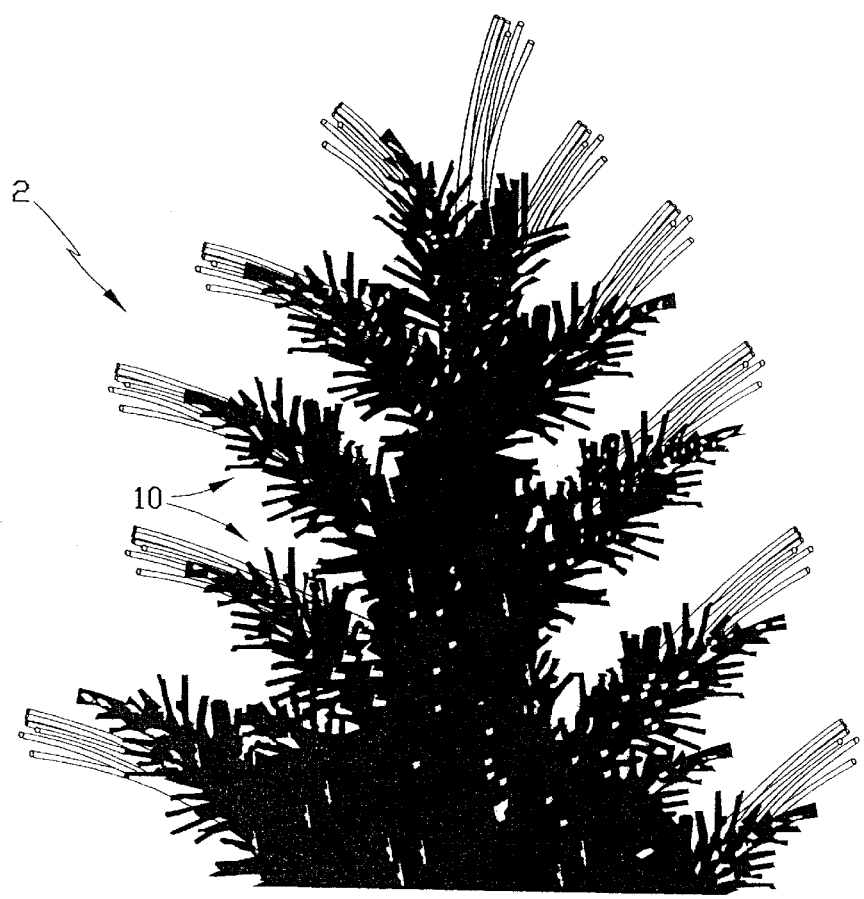
FIG. 1 shows an upper part of an artificial tree provided with optical fibres in accordance with the prior art.
Figures 4, 4A:
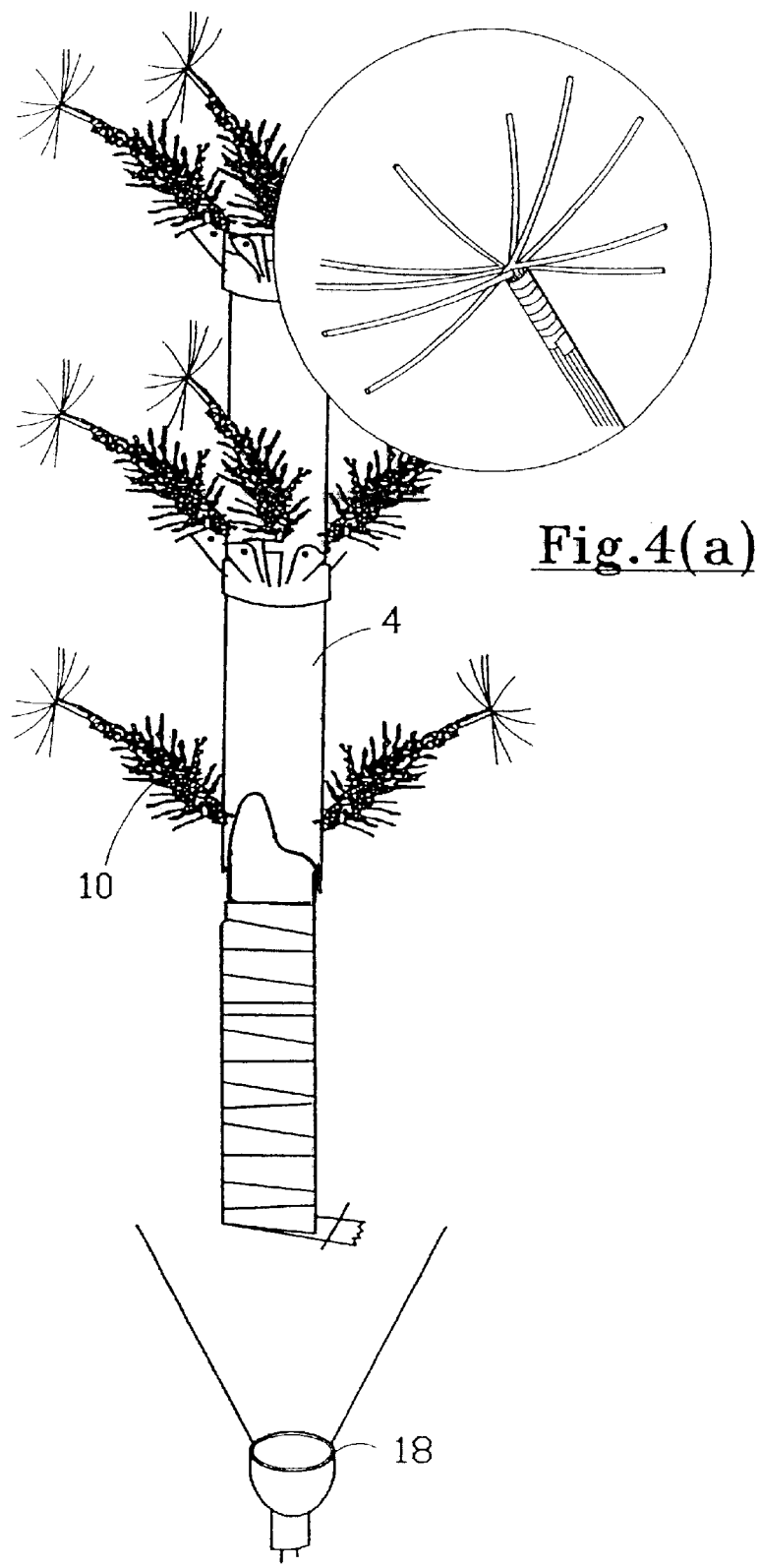
FIGS. 4 and 4(a) show the tree of FIG. 3 in which the fibres have been deformed in accordance with the invention.

Turning to the drawings, FIG. 1 illustrates the upper part of an artificial tree 2 which is preferably, but not exclusively a Christmas tree. The tree 2 has a central trunk 4 as best seen in FIGS. 3 and 4 which is a hollow tube. Fixed at spaced positions along the trunk 4 are supporting brackets 6 which have a number of fingers 8 each of which has a branch 10 secured thereto. The branch 10 comprises a metal wire which is wrapped with a bundle 11 of optical fibres and secured by a tape 12 as can be seen in FIGS. 2(a) to 2(c), before being overlain by a layer of roping 14 in the form of a strip of cut PVC which is twisted around the bundle. The roping 14 is preferably a green colour to simulate the needles of a coniferous tree.

The bundles of optical fibres all extend along the inside of the hollow trunk 4 extending through openings in the trunk adjacent a bracket 6, and adjacent a particular branch-supporting finger 8. The lower proximal ends of the bundles of fibres are secured together by tape 16. The lower end of the trunk is supported in a stand (not shown) which in addition to providing structural support also comprises a housing for a light source 18 which illuminates the lower proximal ends of the bundles of fibres. A rotatable colour wheel may be provided in the stand between the light source 18 and the proximal ends of the bundles of fibres to produce a continuously changing colour effect.

In a conventional tree the distal ends of the bundles of fibres are free and unsupported for a short length allowing them to thereby splay out slightly as shown in FIG. 1 or 2(a). In accordance with the invention, at the bundle ends a short distance from the tips of the fibres, the fibres are specifically bent sharply outwardly as illustrated in FIGS. 2(b) and 2(c). In the regions where the fibres are sharply bent the fibres develop cracks and internal fractures. As a result, light passing along the fibres in addition to being emitted at the fibre tips is reflected and dispersed from the fibres at the position of the fractures, which gives the emitted light a "starburst"-like effect. The fibre ends are deformed after the usual assembly steps are complete by using a simple hand tool such as a pair of pliers which is able to grip the fibres sufficiently tightly to allow the fibres to be sharply bent.

Figure 5:
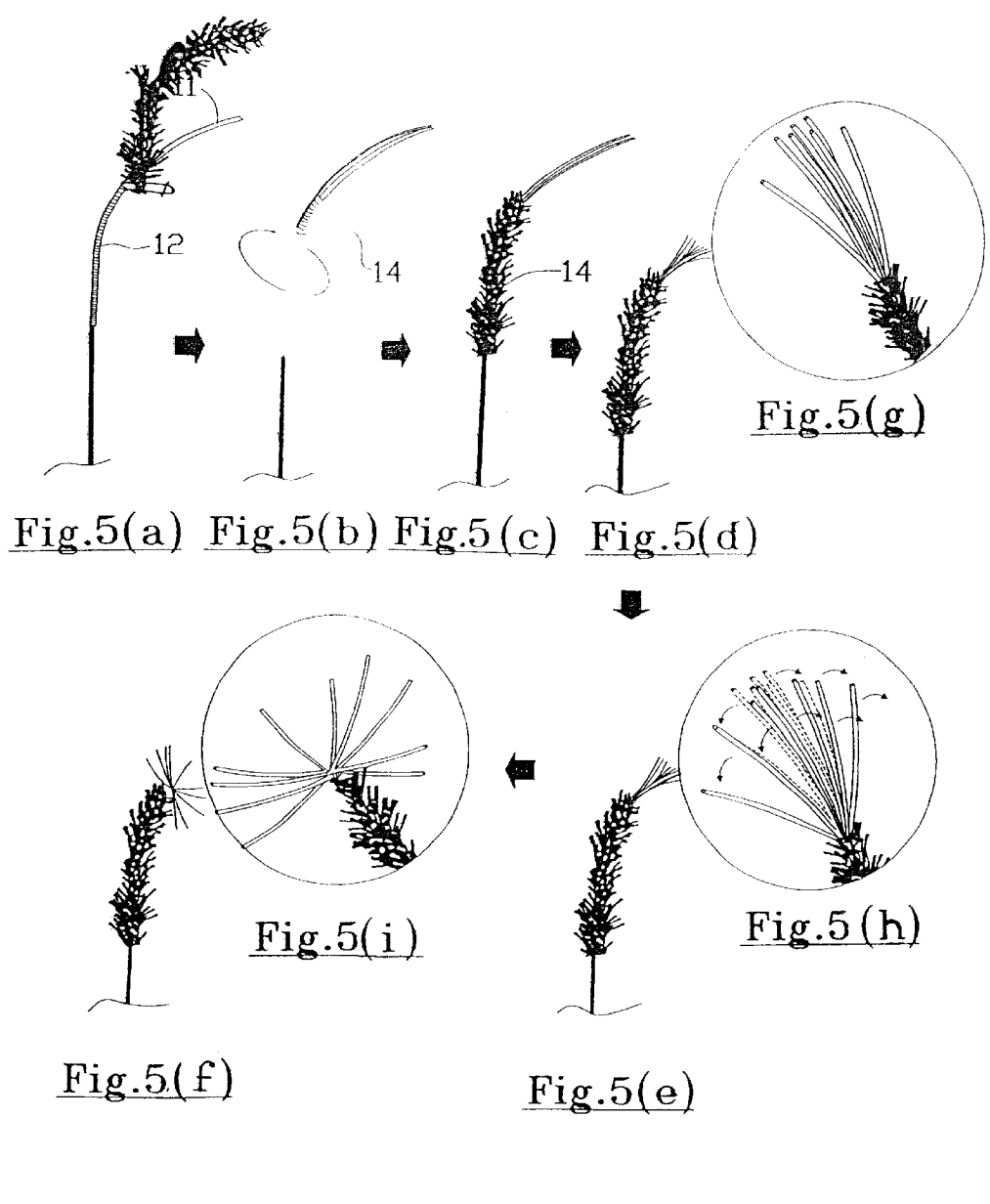
FIGS. 5(a) to (i) illustrate the steps of forming optical fibre bundles.
Figure 6A:
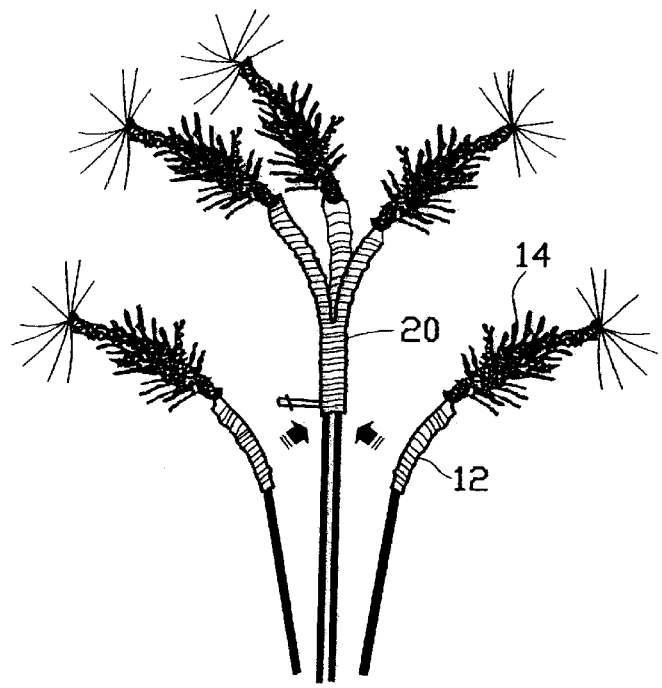
FIGS. 6(a) and (b) show the first two steps of forming optical fibre bundles into a wreath or garland.
Figure 6B:
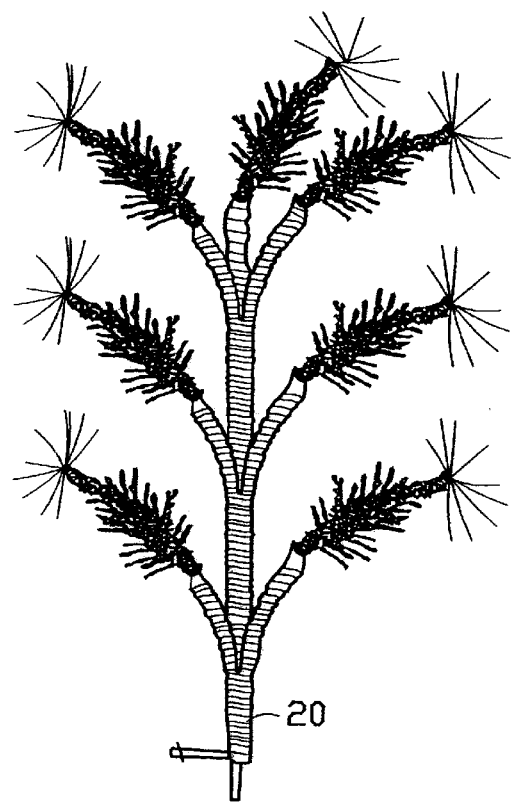
Figure 7A:
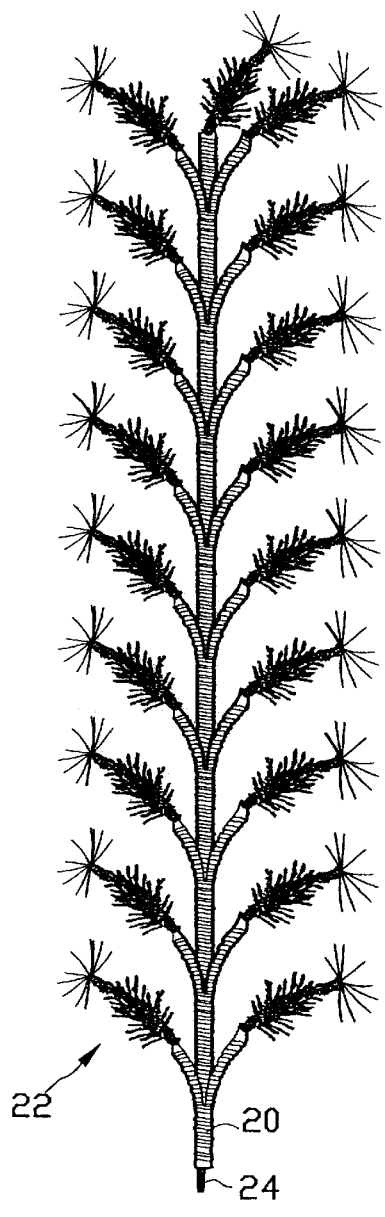
FIGS. 7(a) and (b) show further steps of forming the optical fibre bundles into a wreath or garland.
Figure 7B:
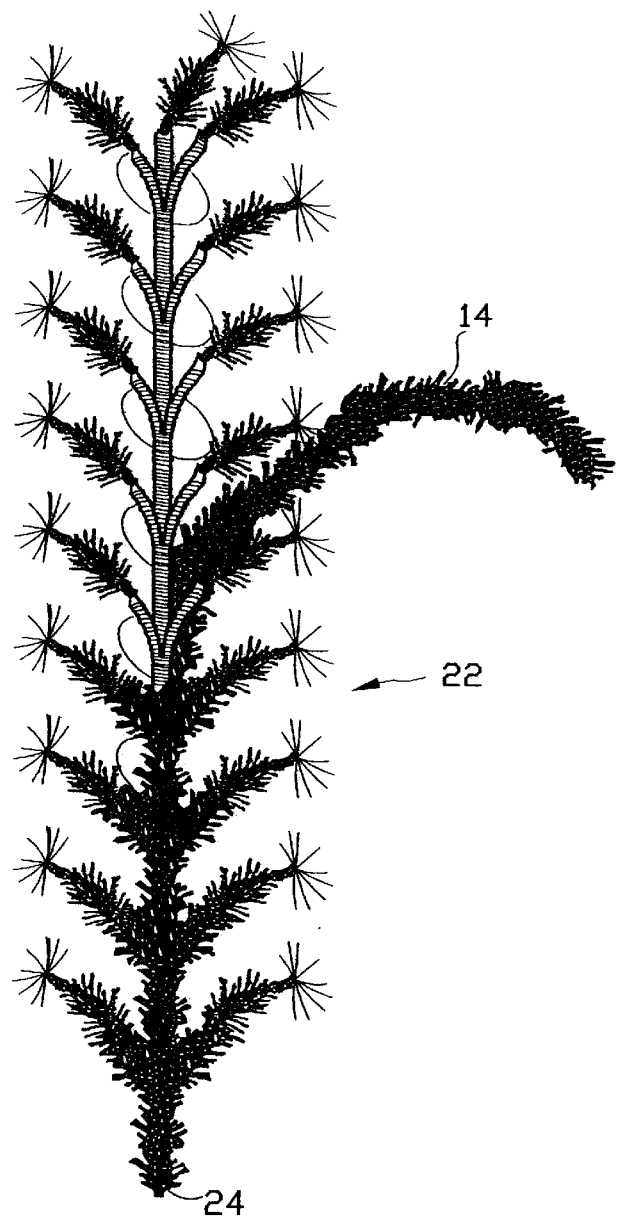

Although the invention is illustrated in relation to an artificial tree, it is equally applicable to an artificial wreath or garland or foliage train where there are bundles of optical fibres led along the branches of foliage stems. FIGS. 5(a) to 5(e) show the steps of wrapping up a bundle of optical fibres. In FIG. 5(a) the bundle of optical fibres 11 is wrapped up along with a piece of wire (which serves to provide rigidity) with a length of tape 12 which extends only a relatively short distance along the bundle. Over this is wrapped roping material 14 which is twisted about the taped bundle. The inset to FIG. 5(d) shows the bundle end, with the free ends of the fibres splaying out slightly. FIG. 5(e) shows the step of bending the fibres outwardly to induce cracking and internal fractures, and resulting in the outwardly splayed shape of FIG. 5(f). As shown in FIG. 6(a) a number of such bundles are placed adjacent each other at spaced positions and secured together with further tape 20, each bundle constituting a "branch". Further bundles are secured in the same manner to produce a longer chain 22 as shown in FIG. 7(a). As indicated in FIG. 7(b), further roping material 14 is wrapped about the chain 22 to conceal the tape 20. If a circular wreath or garland is required a pair of such chains 22 can be joined with the proximal ends of the fibre bundles 24 joined together, and the ends of the two chains 26 joined by suitable means such as a clip or a length of wire to form a ring.

FIG. 8 shows schematically a housing 28 to which the ends 24 are secured, and having a light source 18 directed at the fibre bundle ends 24 and a colour wheel 32 and motor 34 therefor to provide a changing light colour.

If a simple string or foliage train is required either one or two chains 22 may be attached to such a housing 28, without the ends 26 being joined.

What is claimed is:

1. An artificial tree or foliage article provided with at least one bundle of optical fibres having a proximal end at which, in use, a light source is directed, and a distal end, wherein adjacent the distal end the fibres are bent sharply to induce fractures therein.

2. An artificial tree or foliage article according to claim 1 wherein the optical fibres are bent so as to splay radially outwardly from the fibre bundle.

3. An artificial tree or foliage article according to claim 1 wherein the fibres of each bundle are secured by tape up to a short distance from the tips of the fibres, the fibres being sharply bent at the position where the tape finishes.

4. An artificial tree or foliage article according to claim 3 wherein the fibres are sharply bent at a position about 5 cm from the fibre tips.

5. An artificial tree or foliage article according to claim 1 further comprising a central trunk or stem, a plurality of bundles, and a plurality of branches, wherein the bundles of fibres extend along the central trunk or stem, with individual bundles of fibres extending along individual branches.

6. An artificial tree comprising a hollow trunk and a plurality of branches connected to the trunk, a plurality of bundles of optical fibres extending along the inside of the trunk from a lower end thereof at which, in use, a light source is directed, and exiting the trunk adjacent to the individual branches along which the bundles are led, the fibres being sharply bent at regions near to the fibre ends so that the fibres have light-dispersing fractures therein.

7. An artificial wreath or garland comprising at least one bundle of optical fibres having a proximal end at which, in use, a light source is directed, and a distal end, wherein adjacent the distal end the fibres are bent sharply to induce fractures therein.

8. A method of forming an artificial tree or foliage article having a plurality of branches and a plurality of optical fibres, comprising:

(a) forming bundles of fibres which are secured to extend along respective branches; and (b) near ends of the fibre bundles, sharply bending the fibres so as to induce fractures within the fibres.

* * * * *